US 6,350,354 B1

(12) United States Patent
Neuman et al.

(10) Patent No.: US 6,350,354 B1
(45) Date of Patent: Feb. 26, 2002

(54) MODULAR SOLVENT EXTRACTION PLANT

(75) Inventors: Mark Neuman, Mountain Lakes; Roger Cusack, Chester, both of NJ (US); Kevin McLoughlin, Tucson, AZ (US)

(73) Assignee: Koch-Glitsch, Inc., Wichita, KS (US)

( * ) Notice: Subject to any disclaimer, the term of this patent is extended or adjusted under 35 U.S.C. 154(b) by 0 days.

(21) Appl. No.: 09/390,597

(22) Filed: Sep. 3, 1999

(51) Int. Cl.$^7$ ............................................. C25B 15/00
(52) U.S. Cl. ................... 204/233; 204/234; 266/168; 266/170
(58) Field of Search ................ 204/242, 233, 204/232, 234, 267; 266/168, 170; 205/580, 599

(56) References Cited

U.S. PATENT DOCUMENTS 5,935,409 A * 8/1999 King et al. .................. 205/560
5,993,635 A * 11/1999 Hourn et al. ................ 205/568

OTHER PUBLICATIONS

Bailes, P. J., et al., "Liquid–Liquid Extraction: Metals," University of Bradford (Great Britain), orginally published Aug. 30, 1976, pp. 238–246.

Fisher, J. F. C., et al., "Commercial Processes For Copper," *Mining Industry Technical Services*, pp. 649–671. No date avail.

Hennessey, P. M., et al., "Use Coalescing Mehtods To Solve Emulsion Problems," *Hydrocarbon Processing* Brochure, Nov. 1995, pp. 1–12.

Merchuk, Jose C., "Experimental Study of Coppery Extraction with LIX–64N by Means of Motionless Mixers," Department of Chemical Engineering, Ben Gurlon University of Negev, Bear Shava, Israel, *Ind. Eng. Chem. Process Des. Dev.*, vol. 19, No. 1, 1980, pp. 91–96. No month avail.

Streif, Felix., "In–Line Dispersion and Mass Transfer Using Static Mixing Equipment," Separation and Mixing Technology Division, pp. 108–113, reprint from Sulzer Technical Review, Mar. 1977.

Bulletin 892 B–1 Coalescers, Otto York, 1996. No month avail.

Bulletin 892 B–2 Coalescers, Otto York, 1996. No month avail.

Bulletin 892 B–3 Coalescers, Otto York, 1996. No month avail.

Bulletin 892 B–4 Coalescers, Otto York, 1996. No month avail.

Coalescer Application Bulletin ME–LC–1 Brochure, "Liquid–Liquid Coalescing," Koch Engineering Company Inc., p. 1–4, Sep. 1994.

(List continued on next page.)

*Primary Examiner*—Kathryn Gorgos
*Assistant Examiner*—Wesley A. Nicolas
(74) *Attorney, Agent, or Firm*—Shook, Hardy & Bacon LLP (57) ABSTRACT

A modular solvent extraction plant for extracting metal from a metal are is provided. It includes a stage-wise, plug flow contactor that mixes an aqueous solution and an organic solvent solution into a mixed emulsion, a reactor to further mix the solutions, a separator for breaking up the emulsion into an aqueous solution and an organic solution, and a loaded organic coalescer that removes aqueous entrainment. It may also include a raffinate coalescer that removes organic entrainment, a second stage-wise, plug flow contactor that mixes an electrolyte solution with the organic solution from the loaded organic coalescer to form a second mixed emulsion, a second reactor, a second separator for breaking up the second emulsion, and an electrolyte coalescer. An organic scrub station may be used in place of the loaded organic coalescer. The contactors, reactors, separators, and coalescers can be mounted on movable structures.

14 Claims, 4 Drawing Sheets

OTHER PUBLICATIONS

Koch Melt Blender™ Brochure, Bulletin KMB-5, Koch Engineering Company Inc., 1986, pp. 1–6. No month avail.

Liquid–Liquid Extraction Brochure, Koch Process Technologies, Inc., 1998, pp. 1–6. No month avail.

Nickel/Cobalt SX/EW Seminar, Alta Metallurgical Services, presented by Gordon Ritcey et al, May 16, 1996, pp. 1–4.

Static Mixing Technology, Bulletin KSM-6, Koch Engineering Company Inc., 1991, pp. 1–15. No month avail.

* cited by examiner

MODULAR SOLVENT EXTRACTION PLANT

STATEMENT REGARDING FEDERALLY-SPONSORED RESEARCH OR DEVELOPMENT

Not applicable.

CROSS REFERENCE TO RELATED APPLICATIONS

Not applicable.

BACKGROUND OF THE INVENTION

The present invention relates to a plant for use in recovering metal from metal ore using a hydrometallurgical process. More specifically, this plant is a modular solvent extraction plant for extracting a metal such as nickel, cobalt, uranium, or copper from its corresponding metal ore. Still further, this plant may include an organic scrub station, which can be used to remove contaminants or other metals from organic solutions used in extracting the metal.

Metal may be recovered from metal ore through pyrometallurgical or hydrometallurgical processes. Pyrometallurgical processes use smelting to separate desired metals from undesired components and are the way a large percentage of metals produced today are obtained. A typical pyrometallurgical plant includes crushing, grinding, flotation, concentrating, smelting, and refining equipment. One disadvantage with pyrometallurgical processes is that certain metal ores cannot be satisfactorily treated by smelting. Another disadvantage of pyrometallurgical processes is that they create sulfur dioxide emissions. Still another disadvantage of pyrometallurgical processes is that they are less economically efficient.

Hydrometallurgical processes involve extracting metals from ores by dissolving them in aqueous chemical solutions. These processes are often more cost effective than pyrometallurgical processes. However, only certain ores, such as chalcocite ($Cu_2S$), are leachable and thus amenable to hydrometallurgical treatment. Still further, controlling the leaching operation in the hydrometallurgical process is difficult in regions that have heavy or continuous rainfall because of the resulting high silt levels in the leachate.

Currently, conventional hydrometallurgical plants include multiple sets of dynamic pumper-mixers and large settlers that primarily use gravity to separate components in the various stages of hydrometallurgy including extraction, scrubbing, and stripping. Dynamic pumper-mixers, which have dynamic agitators, combine mixing and pumping functions in one piece of equipment. Thus, when increased flow rates are required, the dynamic mixer's speed (rpm) must be increased. The shear imparted by a dynamic mixer/agitator increases with the angular velocity of the agitator, which in turns increases with the radius of the impeller blade and pumper shroud. When agitation speed is increased, the higher shear creates a wider distribution of particle sizes, including the generation of a fine entrainment.

Dynamic mixers and mixer boxes that are conventionally used in hydrometallurgical plants are typically sized so as to require at least about 2 minutes of mixing. Still further, conventional settlers used in hydrometallurgical plants require approximately 6 to 8 minutes for settling because they are normally large vats that work only by allowing gravity to separate an emulsion mixture into a lighter organic phase and a heavier aqueous phase.

One disadvantage with the dynamic pumper-mixers that are currently used in hydrometallurgical plants is that they provide poor process control. For example, they have poor entrainment control for both oil phase into aqueous and vice-versa. As a result, conventional plants have higher operating costs because entrained fluid must be replaced, and certain entrained contaminants require treatment steps, although these combined costs are generally less expensive than the operating costs of pyrometallurgical plants. A disadvantage of conventional settlers is that large and unstable gunk layers (an emulsion of solid particulates, organic, air and aqueous solutions) regularly build up in the settler due to the dynamic mixer action and air being entrained by the mixer. When operating it, oil/aqueous (O/A) ratios close to 1/1, the gunk layer is unstable, and phase inversions occur frequently which require extensive operator attention to remediate. Another disadvantage with conventional hydrometallurgical equipment is that it requires a large inventory of expensive organic solution to be used in the settler(s) to allow gravity separation to take place, and because entrained organic solvent is created by excess shear, it is lost back to the leach areas. Furthermore, such plants can often be inefficient in transferring metal to an organic solution. Still further, entrained aqueous contaminants require expensive bleed streams and special additives in conventional plants in order to maintain a high quality metal electrolyte solution for making metal cathodes in the electrowinning tankhouse. Lastly, ions of iron in the aqueous entrainment reduce electrolytic efficiency by wasting electrical energy on the $Fe^{+++} \leftrightarrows Fe^{++}$ reaction.

In addition to the inefficient equipment in use in conventional hydrometallurgical extraction plants, another problem with these plants is that they are fixed in one location. Therefore, it becomes necessary to pump leach solutions back and forth from remote locations as a mine site matures and expands. Still another problem with such conventional plants is that they are basically open systems, which allows air entrainment and air-borne dust into the system and allows air pollution from the evaporation of the organic. Indeed, environmental regulations are forcing the installation of covers over the entire apparatus. A further problem with conventional hydrometallurgical extraction plants is that they require large amounts of flat surface land area for construction in a location that is normally hilly or mountainous. Thus, large capital expenditures are required to build such mineral processing plants.

Another disadvantage with hydrometallurgical plants is that during the leaching step of a hydrometallurgical process, contaminants, such as iron, manganese, and chlorides, are often leached along with a desired metal by a raffinate and enter into the hydrometallurgical plant as part of the pregnant leach solution. These contaminants are then transferred to the metal electrolyte solution via either entrainment or by the chemical binding of the contaminants to the organic solution used in the extracting stage. When these contaminants are found in the metal electrolyte solution, which is to be sent to the electrowinning tankhouse, this contamination, especially iron contamination, has a serious impact on the electrical deposition current efficiency of the metal electrolyte solution. Also, manganese will attack the anodes and thereby reduce their usable life.

A conventional contaminant and/or secondary metal removal strategy includes construction of an organic scrub circuit, which includes a dynamic pumper mixer-settler. The wash or scrub solution is one that is lean in the contaminant or secondary metal. The dynamic pumper mixer-settler acts to flood the organic solution that includes contaminants with a scrub solution, can simply reduce the concentration of contaminants in the system by dilution, or can chemically remove contaminants by extraction into the aqueous phase. This organic wash circuit works by continuously bleeding out contaminants. In such a process, large volumes of bleed streams result as waste. Fresh make-up solution is then required to keep the recirculating stream whole. One disadvantage with such a method is that the removal of contaminants by this method is typically 40% to 50%. Still another disadvantage with a conventional organic wash circuit is that it is capital intensive in its initial construction. It is also expensive to operate because large volumes of bleed streams and fresh make-up streams are needed.

In order to overcome the deficiencies found with conventional hydrometallurgical extraction plants, a solvent extraction plant that has an optimized extraction efficiency and capacity, a method for making such a plant, and a process for using such a plant are needed. In addition, such a plant should be a closed system. Still further, such a plant should be modular so that it can be moved easily to another location as a mine site matures and expands.

Still further, in order to remove contaminants that enter the hydrometallurgical plant from the loaded organic circuit before they enter the electrolyte plating circuit, an organic scrub station is needed that can effectively remove nearly 100% of the contaminants that have become bound to the pregnant leach solution and are then transferred to the loaded organic solution. Still further, this organic scrub station should be less; expensive in both capital and operating costs than conventional organic wash circuits.

SUMMARY OF THE INVENTION

It is an object of the present invention to provide a solvent extraction plant with physically smaller mixers and separation devices that require shorter residence times and therefore less organic solvent inventory so as to minimize capital costs.

Another object of the present invention is to provide a solvent extraction plant that applies an approximately uniform shear in the various mixing steps of the metal extraction process, even when the flowrates of various streams in the plant are increased, thus allowing a much narrower particle size distribution to result than when conventional dynamic pumper/agitators are used.

Still another object of the present invention is to provide a solvent extraction plant that is capable of providing improved quality metal from electrolyte solutions at a lower operating cost than conventional plants by reducing make-up additive streams and entrained solvent losses.

A further object of the present invention is to provide a compact, portable plant that can be readily relocated to alternate mine sites making it unnecessary to pump leach solutions back and forth from remote locations as a mine site matures, expands, or changes. The concentrated electrolyte solution may require pumping back to the tankhouse, but it is typically one-third the volume of the leach solution.

A further object of the present invention is to provide an extraction plant that is a closed system so that there will be no more than a minimal amount of air entrained during mixing, ambient dust entering the system, and evaporative losses of organic solvent.

Another object of the present invention is to provide a plant that can be less susceptible to phase inversions and crud/gunk layer expansions and overflows, so as to reduce the number of site operating personnel required for process control and operation.

Still another object of the present invention is to provide a hydrometallurgical plant that has a lower initial capital development cost and allows for lower operating costs than conventional hydrometallurgical plants.

A further object of the present invention is to provide an organic scrub station for treating loaded organic solution from the plant and a process for using this organic scrub station to remove nearly 100% of undesirable contaminants from the organic solution, so that fewer contaminants enter further hydrometallurgical processing stages, such as the electrowinning stage.

Another object of the present invention is to provide an organic scrub station for removing contaminants from the loaded organic solution created in the plant that requires less scrub solution than conventional equipment, thus allowing less money to be spent on scrub solution, and a process for using the same.

Still another object of the present invention is to provide a clean and simple process for removing contaminants from organic solution and equipment that is able to be used in this process, so that contaminants are removed rather than just being diluted away.

A further object of the present invention is to provide an organic scrub station for treating loaded organic solution from the plant and a method for using the same in order to remove contaminants that are chemically bound to an organic solution.

Still another object of the present invention is to provide a method for making and a method for using the plant described above.

According to the present invention, certain of the foregoing objects and other objects are achieved by a modular solvent extraction plant, a method of making the same, and a method of using the same. This modular solvent extraction plant is downstream of a leach site containing metal ore where acid-enriched raffinate is fed into the leach dump or heap, and the raffinate leaches metal from the metal ore, forming a pregnant leach solution (PLS). In high volume hydrometallurgic plants requiring few theoretical stages, the PLS is then pumped to a stage-wise, plug flow contactor(s) that mixes the pregnant leach solution with an independently pumped barren organic solution to form a mixed emulsion. During the mixing process, the metal is extracted by and transferred to the organic solution, resulting in a loaded organic solution and a metal depleted raffinate as the components of the mixed emulsion. The mixed emulsion is then fed to a separator having corrugated sheet or parallel plate coalescing material in its first section. The separator separates the raffinate from the loaded organic solution. The raffinate is then fed into a raffinate coalescer, which removes organic entrainment from the raffinate. The loaded organic solution is then fed into a loaded organic coalescer unit, which removes raffinate entrainment from the loaded organic solution. The loaded organic solution is then fed into a second stage-wise, plug flow contactor, which mixes the loaded organic solution with a lean electrolyte solution. The metal in the loaded organic solution is transferred to the electrolyte solution leaving a mixture of a barren organic solution and a rich metal electrolyte solution. The mixture is then fed into a second separator that separates the metal electrolyte solution from the barren organic solution. This second separator also includes corrugated sheet or parallel plate coalescing material in its first section. The metal electrolyte solution is then fed into an electrolyte coalescer unit, which removes organic entrainment from the metal electrolyte solution. The metal-rich electrolyte solution is then fed to an electrowinning tankhouse, wherein metal cathodes are formed.

Additional objects are achieved by an organic scrub station for treating loaded organic solution from the plant and a process for using the same. The organic scrub station includes a stage-wise, plug flow contactor that mixes a scrub solution and loaded organic solution from the plant, which is comprised of an organic solution, a desired metal and certain contaminants, into a mixed emulsion, a separator connected to the contactor and having a first section comprised of coalescing material for breaking up the emulsion and a quiet zone for further separation of the scrub solution and the loaded organic solution, and a coalescer for receiving the loaded organic solution from the separator, wherein the coalescer removes scrub solution entrainment from the loaded organic solution. Still another aspect of the present invention is a process for removing contaminants from the loaded organic solution created in the plant using the organic scrub station of the present invention. This process involves mixing a scrub solution and a loaded organic solution, which is comprised of an organic solution, a desired metal and contaminants, into an emulsion, wherein said contaminants are transferred to said scrub solution, separating the emulsion into a scrub solution containing contaminants and a loaded organic solution, and polishing the loaded organic solution by feeding it through a coalescer so as to remove scrub solution entrainment.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

In the accompanying drawings, which form a part of the specification and are to be read in conjunction therewith and in which like reference numerals are used to indicate like parts in the various embodiments.

DETAILED DESCRIPTION OF THE PREFERRED EMBODIMENT

Figure 1:
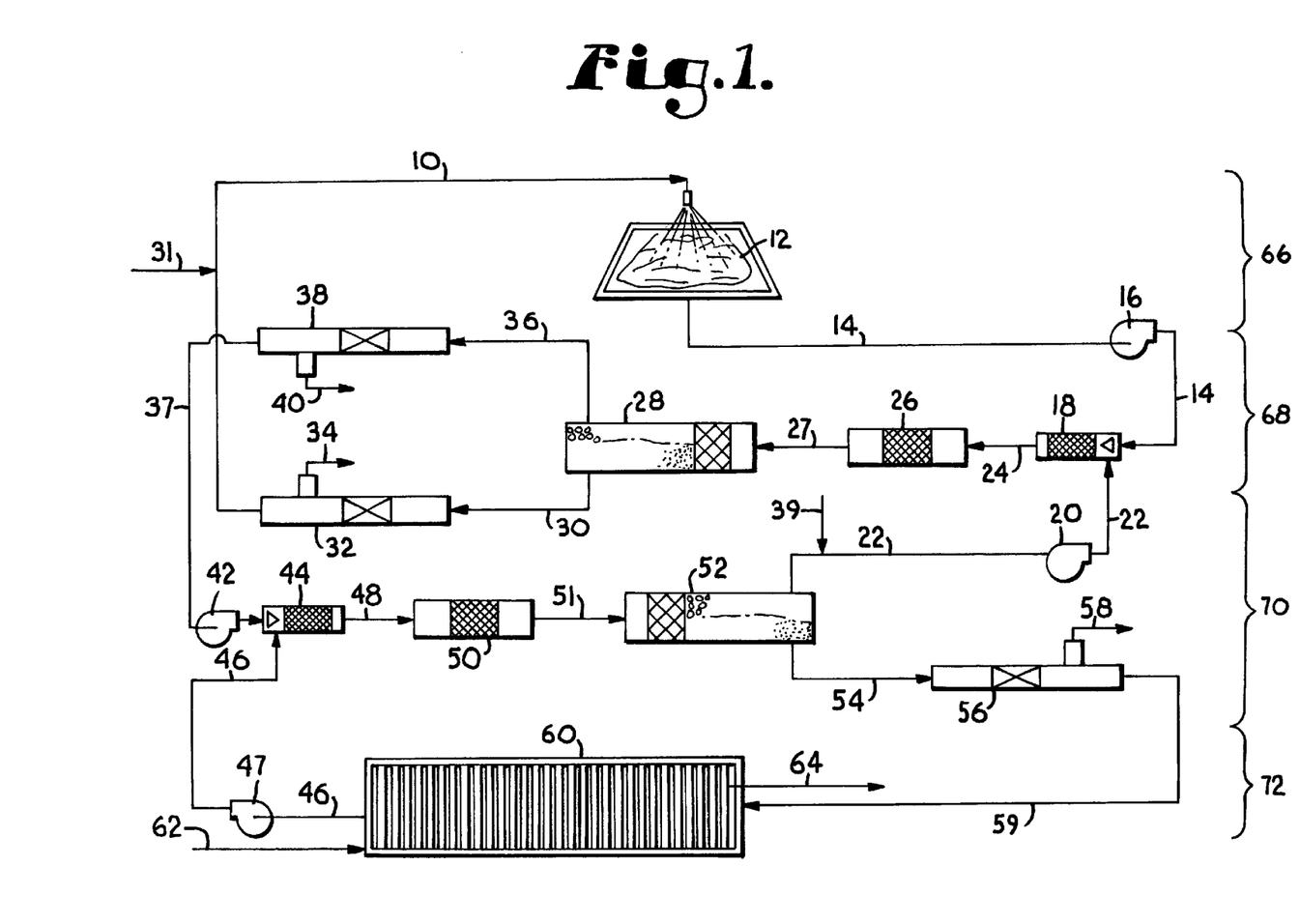
FIG. 1 is a schematic representation of a modular solvent extraction plant of the present invention employing a single extraction stage only.
Figure 3:
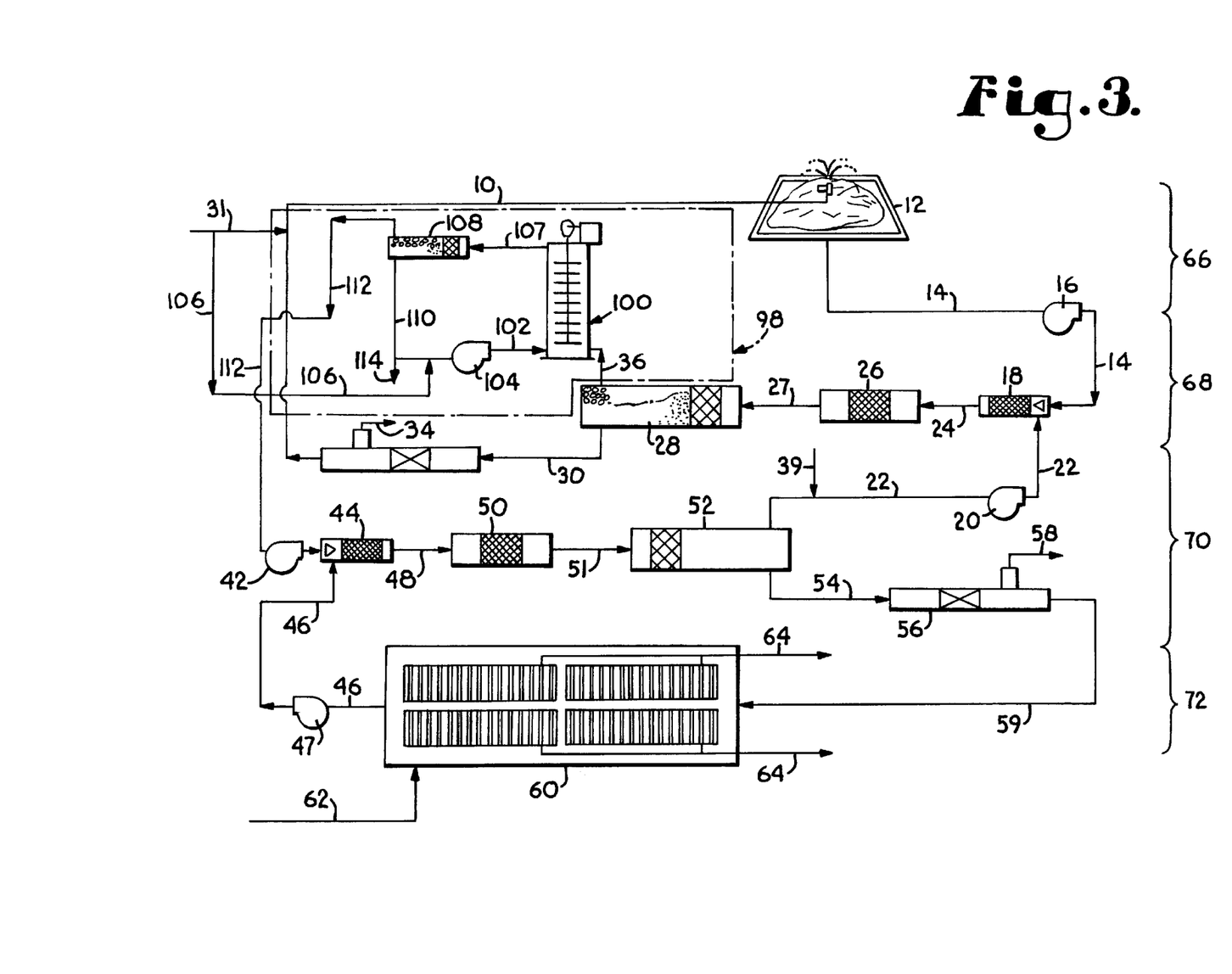
FIG. 3 is a schematic representation of a modular solvent extraction plant of the present invention that includes an organic scrub station.

The modular solvent extraction plant of the present invention includes for extraction stage-wise, plug flow contactor(s), reactor(s), separator(s), a loaded organic coalescer, a raffinate coalescer, for stripping a second series of stage-wise, plug flow contactor(s), second reactor(s), second separator(s), an electrolyte coalescer, and associated pumps. Specifically, in one embodiment, which is shown in FIG. 1, piping 10 transports raffinate onto leach area 12 where it extracts metal from the metal ore in leach area 12 and becomes a pregnant leach solution. Line 14 transfers the pregnant leach solution, which is pumped by pump 16, to stage-wise, plug flow contactor 18. Pump 20 pumps barren organic solution in line 22 into contactor 18. Line 39 is connected to piping 22 and transports make-up organic solution to piping 22. Contactor 18 mixes pregnant leach solution and barren organic solution to form a mixed emulsion which exits contactor 18 in piping 24. Piping 24 transports the mixed emulsion to reactor 26, which allows for most of the dwell time of the emulsion. Piping 27 then transports the mixed emulsion from reactor 26 to separator 28. Separator 28 separates the extraction emulsion into a raffinate and a loaded organic solution. Piping 30 transports the raffinate to raffinate coalescer 32 where organic entrainment is removed. Line 34, which is connected to raffinate coalescer 32, is used to remove organic entrainment from raffinate coalescer 32. Piping 10 then transports raffinate from raffinate coalescer 32 to leach area 12 for recycle. Line 31 is connected to piping 10 and transports make-up aqueous solution to the raffinate in piping 10. Piping 36 transports loaded organic solution from separator 28 to loaded organic coalescer 38, as shown in FIG. 1, or organic scrub station, as shown in FIG. 3 and discussed infra. Piping 40, which is connected to loaded organic coalescer 38, is used to remove raffinate entrainment from the loaded organic solution. Piping 37 transports loaded organic solution from loaded organic coalescer 38 to a second stage-wise, plug flow contactor 44 for stripping. Pump 42 pumps the loaded organic solution in piping 37 into contactor 44. Piping 46 transports an electrolyte solution, which is pumped by pump 47, into contactor 44. Contactor 44 mixes the loaded organic solution and the electrolyte solution to form a second mixed emulsion. Line 48 transports this mixed emulsion from contactor 44 to second reactor 50, which allows for most of the dwell time of the emulsion. Line 51 transports the mixed emulsion from reactor 50 to second separator 52. Separator 52 separates the mixed emulsion into a barren organic solution and a metal electrolyte solution. Pump 20 pumps the barren organic solution, which is in line 22, from separator 52 to contactor 18 for recycle. As discussed previously, line 39 is connected to piping 22 and transports make-up organic solution to piping 22. Piping 54 transports the metal electrolyte solution from separator 52 to electrolyte coalescer 56. Piping 58 transports recovered organic entrainment from electrolyte coalescer 56. Piping 59 then transports the metal electrolyte solution from coalescer 56 to electrowinning tankhouse 60 via the tankhouse piping circuit. Line 62 feeds electrolyte make-up solution into electrowinning tankhouse 60. Metal cathodes are obtained from electrowinning tankhouse 60 and are represented as exiting tankhouse 60 by line 64. Piping 46 transports electrolyte solution from electrowinning tankhouse 60 to contactor 44 via pump 47 for recycle. Holding tanks required for surge capacity and treatment of the process streams with additives are not shown.

The stage-wise, plug flow contactors used in the plant of the present invention take advantage of the favorable kinetics of extractants that have been developed in recent years. As a result, these contactors or series of contactors have a residence time of less than 15 seconds. Each contactor used in the present invention separates the mixing and pumping functions among different pieces of equipment and does not employ dynamic agitation. Preferably, it applies an approximately uniform shear in mixing two liquid phases together thus giving a much narrower particle size distribution than can be achieved by using dynamic pumper/mixers. The contactor is used in the extracting stage to mix a barren organic solution and a pregnant leach solution, which is an aqueous solution containing metal, to form a mixed emulsion so as to transfer metal from the leach solution to the organic solution. The second contactor is used in the stripping stage to mix a loaded organic solution and an electrolyte solution to form a second mixed emulsion so as to transfer metal from the organic solution to the electrolyte solution.

In one embodiment of the present invention, either or both of the stage-wise, plug flow contactors are static mixers. This embodiment is shown in FIG. 1. Static mixers are in-line mixers with no moving parts. They consist of a series of stationary, rigid elements placed lengthwise in a pipe. These elements form intersecting channels that split, rearrange and recombine component streams into progressively smaller and smaller layers, until ultimately one homogeneous stream exists. Static mixers produce a narrow drop size distribution in the solutions being mixed, an ideal mixing of the various phases being mixed, and a close residence time distribution of all liquid particulates. Preferably, the static mixers apply an approximately uniform shear in mixing the two liquid phases.

Figure 2:
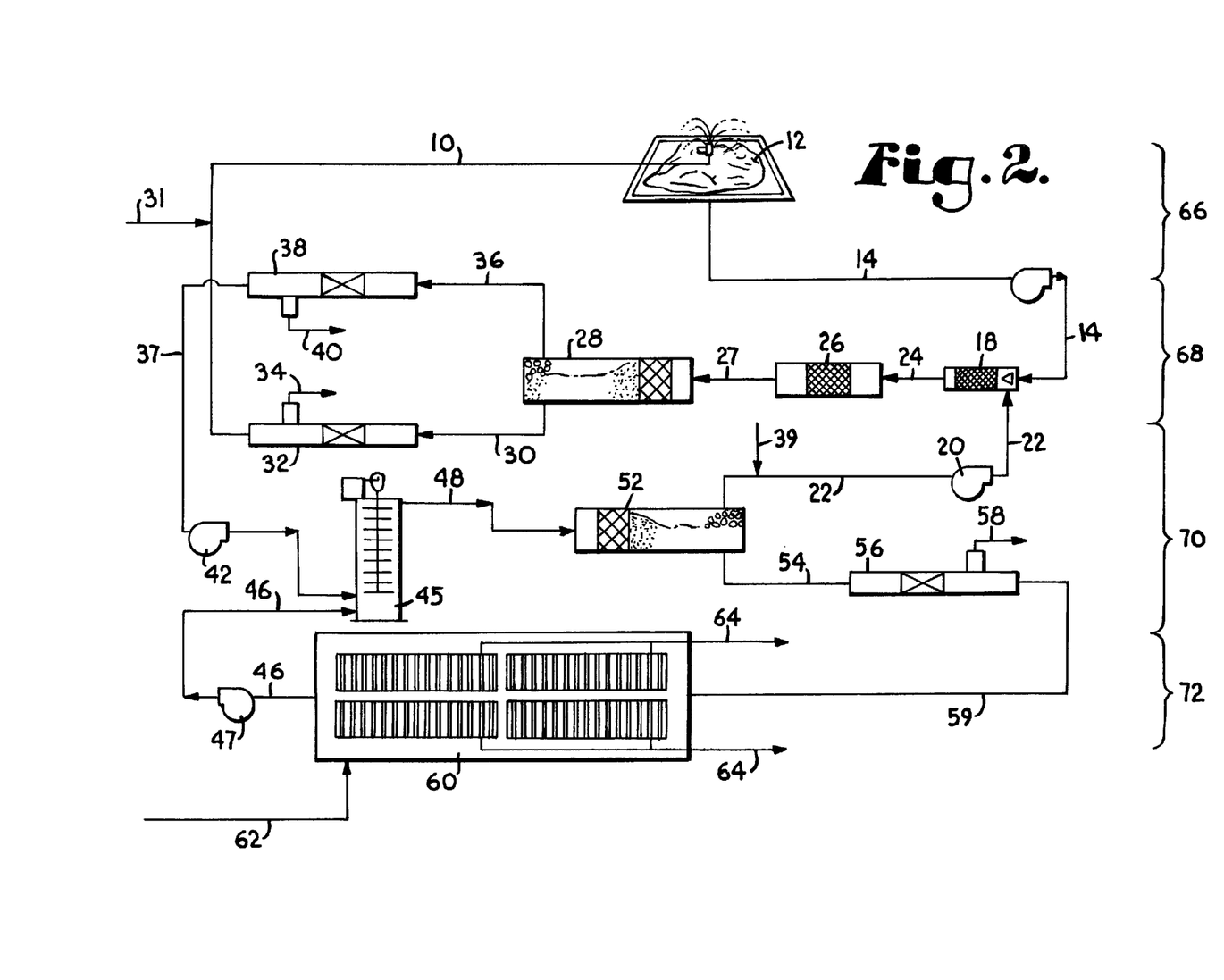
FIG. 2 is a schematic representation of a modular solvent extraction plant of the present invention that includes a co-current column as the second stage-wise, plug flow contactor of the plant used here for stripping the metal being extracted from the loaded organic stream.

In an alternative embodiment of the present invention, either or both of the stage-wise, plug flow contactors in the extraction plant may be a co-current vertical extraction column with a stack of reciprocating perforated plates which perform a mixing function. Such an embodiment is shown in FIG. 2, wherein second contactor 44 and second reactor 50, which are shown in FIG. 1, have been replaced by co-current vertical extraction column 45. Piping 37, which transports the loaded organic solution, now connects loaded organic coalescer 38 to column 45. Piping 46, which transports electrolyte solution, now connects electrowinning tankhouse 60 to co-current column 45. Line 48 transports the mixed emulsion formed in column 45 to separator 52. Preferably, such a structure is a Karr Extraction Column, which may be purchased from Koch Process Technologies, Inc. (KPTI), 1055 Parsippany Blvd., Parsippany, N.J., 07054. Preferably, the co-current vertical extraction column 45 gives a much narrower particle size distribution than a dynamic pumper/mixers because it applies an approximately uniform shear in mixing the two liquid phases together by virtue of its reciprocating, rather than revolving motion. The intensity of mixing in the co-current vertical extraction column 45 can be varied independently of the flowrate by simply changing the power input to the column's motor. Also, the residence time in the column can be varied by use of an alternative outlet connection up to the column tower. Lastly, the selection of whether the aqueous or organic phase is the continuous phase can be varied independent of phase ratio by introducing both phases either at the top or the bottom of the column tower. The advantage of this added flexibility in the process is that variations in ore content, process stream flowrates, and extractant compositions can be handled without reconfiguring piping and equipment, while minimizing the creation of excess entrainment. Extraction efficiencies equivalent to one theoretical stage and high capacities for the combined organic and aqueous streams may be obtained using a co-current vertical extraction column. This embodiment is preferable with high volume, base metals, such as copper.

In still another embodiment of the present invention (not shown), either or both of the contactors may be a co-current agitated packed (AP) column, which is another type of a stage-wise plug flow contactor (supplied by KPTI). An AP column has a rotating shaft that turns turbine impellers, which are alternately distributed throughout the column between packing material. Preferably, the AP column applies an approximately uniform shear in mixing the two liquid phases together.

The reactors 26, 50 in the plant of the present invention, as shown in FIG. 1, are used in conjunction with the stage-wise, plug flow contactors to further contribute to the transfer of metal from one liquid phase to another. The reactors include static mixing elements having a design that agitates the immiscible phases more gently than in the contactors. The reactors further gently mix the two liquid phases to maintain the emulsions. Preferably, the residence time for the reactors is less than 1 minute but may require up to 2 minutes.

The separators 28, 52 in the plant of the present invention, as shown in FIGS. 1 and 2, include two sections. The first section is comprised of corrugated sheet coalescing material for breaking up the emulsion created in the contactor 18, 44. The second section is a quiet zone for further separation by gravitational forces. Preferably, the coalescing material used in the first section of the separator 28, 52 is corrugated sheets of metal or plastic such as that used for coalescing media. Most preferably, it is KY-FLEX coalescing media, which may be obtained from the Koch-Otto York Division of Koch-Glitsch, Inc., 42 Intervale Road, P.O. Box 3100, Parsippany, N.J. 07054-0918. The residence time for the separators 28, 52 is between about 1 and 12 minutes. Preferably, by using coalescing media in the first section of the separator, separation time can be reduced to less than about 2 minutes, which results in inventory requirements being reduced. This is done by coordinating the selection of the KY-FLEX with the known particle size distribution from the reactors. The separator 28 used in the extracting phase separates the mixed emulsion into an aqueous solution and a loaded organic solution. The separator 52 used in the stripping phase separates the second mixed emulsion into a barren organic solution and a metal electrolyte solution. These separators 28, 52 accomplish at least 99% separation. Thus, less than one percent entrainment remains after the various streams are fed through the various coalescers in the plant of the present invention.

In another embodiment of the present invention (not shown), the separator and the coalescer are replaced by a separator comprised of three sections. The first two sections of this separator are the same as the separator described above and the third section includes coalescing media. Thus, entrainment is removed within the separator in this embodiment.

The plant of the present invention, as shown in FIGS. 1 and 2, further includes coalescers 32, 38, 56 to polish the separation performed by the two section separator by collecting fine droplets of entrainment. Coalescence is the process by which very fine droplets physically join together to form larger drops, which then settle naturally by gravity. Vessels fitted with coalescing media act to accelerate the liquid phase separation by increasing the dispersed phase droplet size. The liquid-liquid coalescers used in the plant of the present invention may be of horizontal or vertical orientation and may or may not include internal weirs and boots. The choice of styles and arrangements depends on location in the plant, flowrates, and the percentage of a dispersed phase in a solution. The coalescer media may be a corrugated plate interceptor, a porous blanket of knitted wire mesh in metal and/or plastic, or hollow, cylindrical beds packed with glass, polyester, propropylene, or ceramic fibers. Examples of such media are KY-FLEX, KY-P-Pack, KY-K-Pack, KY-M-Pack, KYA-Pack, Flexichevron Style II®, Fleximesh®, and Flexifiber®, all of which may be obtained from the Koch-Otto York Division of Koch- Glitsch, Inc., 42 Intervale Road, P.O. Box 3100, Parsippany, N.J. 07054-0918. Preferably, each of the coalescers used in this plant includes multi-filament media, which incorporate ultra-fine fibers in their make-up so that dispersions of micron size may be coalesced. Preferably, the residence time for the coalescers is less than 2 minutes whereas the conventional residence time is about 5 minutes.

Referring to FIGS. 1 and 2, the loaded organic coalescer 38 is fed the loaded organic solution exiting the separator 28. It removes aqueous raffinate entrainment from the loaded organic solution. The raffinate coalescer 32 is fed aqueous solution or raffinate exiting the separator 28. It removes organic entrainment from the raffinate before it is sent back to the leach areas 12 for another leach cycle to become a pregnant leach solution. The electrolyte coalescer 56 is fed a metal electrolyte solution. It removes organic entrainment from the metal electrolyte solution before it is fed to an electrowinning tankhouse 60.

The embodiments shown in FIGS. 1–3 are most desirable for use in copper extraction. Still further, the modular solvent extraction plant of the present invention may include multiple contactors, separators and/or coalescers at each stage of the process. Such modified plants are more desirable for extracting metals such as cobalt and nickel.

It is desirable to periodically clean each of the coalescers used in the present invention. The coalescers may be manually cleaned or cleaned by an automated system.

It may be desirable to use an organic scrub station 98, in place of the loaded organic coalescer 38. Organic scrub station 98, which is another embodiment of the present invention is shown in FIG. 3, with the dotted lines encircling the equipment which comprises the organic scrub station 98. Piping 112 transports loaded organic solution from organic scrub station 98 to a second stage-wise, plug flow contactor 44. Pump 42 pumps the loaded organic solution in piping 112 into contactor 44.

This organic scrub station 98 includes a stage-wise, plug flow contactor 100, here a co-current Karr column, in which piping 102 transports an aqueous scrub solution to contactor 100. Pump 104 is used to pump the aqueous solution in piping 102. Piping 36 transports loaded organic solution from first separator 28 to contactor 100. Piping 107 feeds the mixture leaving contactor 100 into scrub station separator 108. Scrub station separator 108 separates the aqueous solution and the loaded organic solution. Piping 110 transports aqueous solution from scrub station separator 108. Piping 110 is connected to piping 102 and aqueous solution may be recycled by transporting it from piping 110 to piping 102 and then into contactor 100. Bleed stream 114 allows aqueous solution in piping 100 to exit the system. Line 106 transports make-up aqueous solution to line 102. Line 31 supplies additional aqueous solution to piping 10 and line 106. Piping 112 transports loaded organic solution from scrub station separator 108 to stage-wise, plug flow contactor 44. This loaded organic solution is pumped through piping 112 by pump 42. Optionally, a coalescer unit, which is not shown, may be attached to scrub station separator 108 so as to further remove any aqueous entrainment from the organic solution.

The stage-wise, plug flow contactor 100 used in the organic scrub station of the present invention takes advantage of the favorable kinetics of extractants that have been developed in recent years. As a result, this contactor 100 has a residence time of about one minute or less and separates the mixing and pumping functions among different pieces of equipment without generating spinning agitation. Preferably, it applies an approximately uniform shear in mixing two liquid phases together, thus giving a much narrower particle size distribution than a dynamic mixer/pumper-settler. Specifically, the contactor 100 is used to mix the loaded organic solution with the aqueous scrub solution so as to transfer contaminants from the loaded organic solution to the aqueous solution.

Stage-wise, plug flow contactor 100 of organic scrub station 98 may be a static mixer plug reactor(s) (not shown), a co-current vertical extraction column with a stack of reciprocating perforated plates which perform a mixing function (not shown), or a co-current agitated packed (AP) column (not shown). Each of these types of contactors are described in more detail previously.

The scrub station separator 108 in organic scrub station 98 may be similar to or the same as separators 28 and 52 or as the three section separators described above. The organic scrub station 98 of the present invention optionally includes a coalescer (not shown) to polish the loaded organic solution by collecting fine droplets of aqueous entrainment. Suitable coalescers are described above. This organic scrub station of the present invention also may be used in other plants where contaminants need to be removed from organic solutions.

Figure 4:
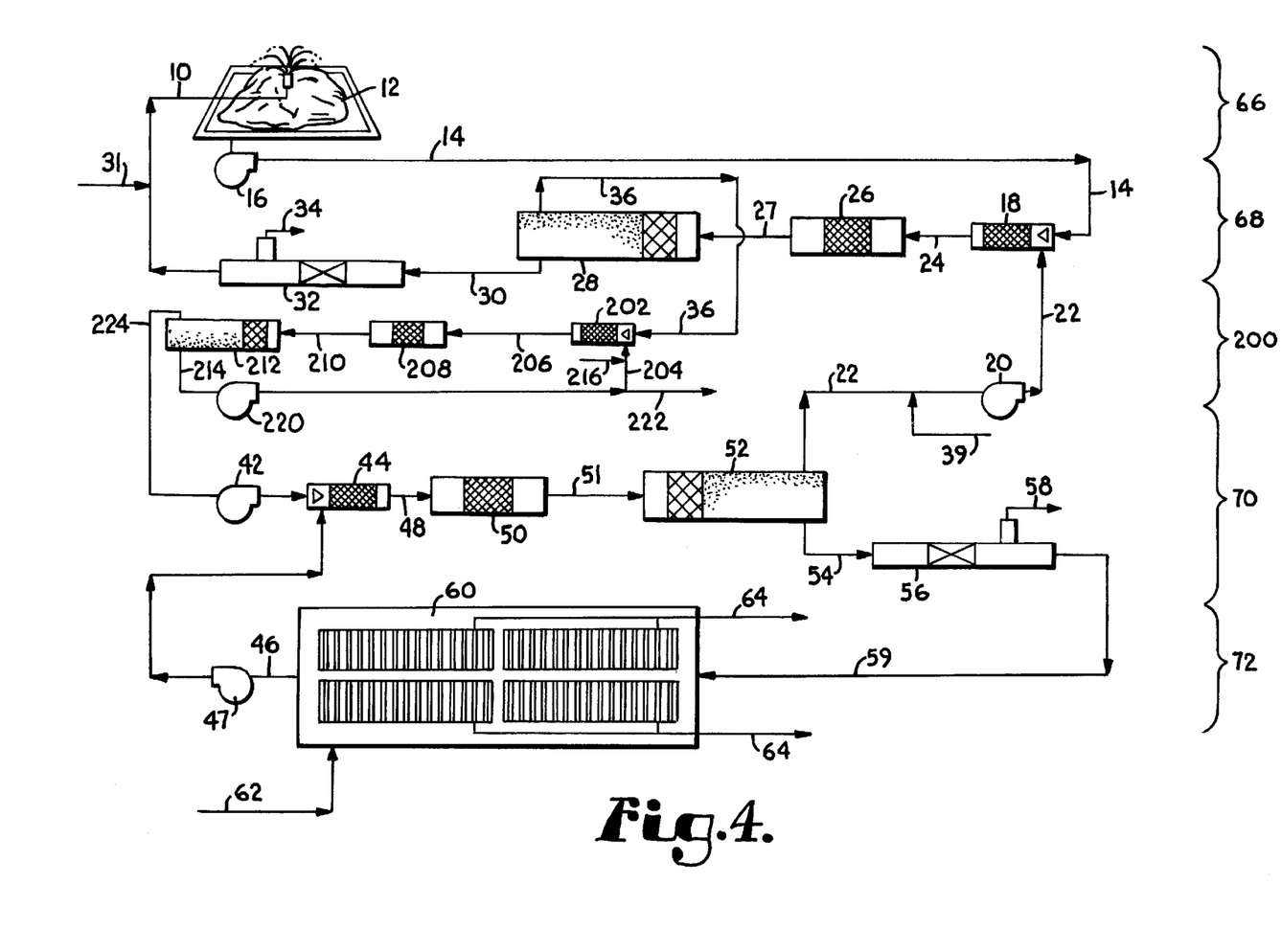
FIG. 4 is a schematic representation of a modular solvent extraction plant that includes a scrubbing section.

Still another embodiment of the present invention involves the modifying the plant shown in FIG. 1 by adding scrubbing section 200, as shown in FIG. 4. The scrubbing section 200 receives loaded organic solution via piping 36 from separator 28, which is part of the extracting stage 68. Piping 36 is fed to stage-wise plug flow c:contactor 202. Scrub solution 204 is also fed to contactor 202. The resulting mixture exits contactor 202 in line 206 and then is fed into reactor 208. The stream exits reactor 208 via piping 210. Piping 210 feeds into separator 212 which removes undesired components from the loaded organic solution. Undesirable components exit the coalescer 212 in line 214. Pump 220 pumps the scrub solution in line 214 back to stage-wise plug flow contactor 202. Bleed stream 222 leaves stream 214 and becomes stream 204 before it is pumped back to contactor 202. Additional scrub solution 216 is added to line 204. The more purified loaded organic solution exits coalescer 212 in line 224. Line 39 is connected to line 224 and transports makeup organic solution to line 224.

The solvent extraction plant of the present invention may be used in place of the solvent extraction portion of any conventional hydrometallurgical plant. This plant can be used to recover metal from a leachable and extractable ore. In addition, metal concentrates from non-leachable ores obtained by other methods, such as autoclaving, or other pretreatments may be solvent extracted by this plant. Examples of metals that may be extracted using the plant of the present invention include copper, nickel, cobalt, zinc, gold, and uranium.

Another aspect of the present invention is a process for obtaining metal from its corresponding ore using the plant of the present invention described above. The overall objective of this plant is to transfer metal from a leaching solution to a tankhouse for cathode plating using a series of pressurized pipes of various diameters. In general, the process of the present invention involves collecting a pregnant leach solution containing a low metal concentration and then feeding the solution through a plant that produces a high-grade metal electrolyte solution, which is then fed into an electrowinning tankhouse for the production of metal cathodes, or to a reduction plant for precipitation of powders by a gas.

More specifically, this process preferably involves five steps, namely, leaching 66, extraction 68, scrubbing 200, stripping 70, and electrowinning 72, as shown in FIG. 4. The leaching step involves feeding a raffinate into a leach area 12 so as to extract a desired metal from the leach area 12 and form a pregnant leach solution, using conventional methods. The extraction step involves extracting metal from the pregnant leach solution using an organic solution of inert carrier and extractant. This is accomplished by feeding the pregnant leach solution and the organic solution through the stage-wise, plug flow contactor 18, reactor 26, separator 28, and loaded organic coalescer 38, which are connected in series as described above and are shown in FIGS. 1 and 2. In this extracting step, the desired metal is preferentially transferred to the organic solution so as to produce a loaded organic solution and raffinate. Raffinate exiting the separator 28 is fed through a raffinate coalescer 32, which removes organic entrainment from the raffinate. Then, the raffinate is recycled to the leach area 12 for another leach cycle where it again becomes pregnant leach solution. Preferably, two theoretical stages of extraction are used when extracting copper. Preferably, two to four theoretical stages of extraction are used when extracting other metals such as nickel, cobalt, zinc, and uranium.

The stripping step involves stripping metal from the loaded organic solution using an electrolyte solution. This is accomplished by feeding the loaded organic solution and the electrolyte solution through the second stage-wise, plug flow contactor 44, the second reactor 50, the second separator 52, and the electrolyte coalescer 56, which are connected in series as described above and are shown in FIGS. 1 and 2. In this stripping step, the metal is transferred from the loaded organic solution to the electrolyte solution, which is a more concentrated acid solution than the pregnant leach solution and which is suitable for electroplating, so as to form a barren organic solution and a metal electrolyte solution. The barren organic solution is then recycled by being directed back to the extraction stage contactor 18 for another loading of metal from the pregnant leach solution.

The electrowinning step involves feeding the metal electrolyte solution to an electrowinning tankhouse 60, as shown in FIGS. 1–4. In the electrowinning tankhouse 60, metal is deposited on a cathode using D.C. power, lead alloy anodes, and starting sheets of either the particular desired metal or stainless steel starter blanks.

Another aspect of this process involves removing contaminants using organic scrub station 98, as shown in FIG. 3. This process involves feeding contaminant-rich loaded organic solution into a stage-wise, plug flow contactor 100. Scrub solution is also injected into the contactor 100 for a complete and thorough mixing with the contaminant-rich loaded organic solution. The contactor 100 of the organic scrub station 98 works to thoroughly engage the scrub solution against the chemically bound contaminants and works to transfer them onto water molecules in the scrub solution. During this mixing process, contaminants are released from the organic solution and transferred to the aqueous scrub solution. The cumulative flow stream is then directed into a scrub station separator 108. It first enters a packing zone in the scrub station separator 108 where the emulsion is broken up. Following this, the broken up emulsion enters the settler zone of the scrub station separator 108, which further separates the solutions by gravitational forces. The organic/scrub solution emulsion, which is formed by the contactor 100, is broken up and separated into a contaminant free organic stream and a contaminant laden aqueous solution in the scrub station separator 108. Optionally, the loaded organic stream is then directed to a coalescer for final aqueous entrainment removal. This leaves a basically contaminant-free loaded organic solution. The contaminant laden scrub solution then is sent to a contaminant removal station so that contaminants in it may be removed and it may then be recirculated (not shown on drawing). This contaminant removal station may be comprised of reverse osmosis membranes or may include other technologies appropriate to remove contaminants from the recirculating solution. After contaminant removal, the regenerated scrub solution is then sent back for another contaminant pick-up circuit. The process of the present invention may also be performed with any of the alternate equipment that was discussed previously.

The raffinate and the electrolyte solution are both aqueous solutions. Any conventional hydrometallurgical raffinate and electrolyte solutions may be used. These solutions may be, but are not limited to, aqueous sulfuric acid, aqueous hydrochloric acid, or aqueous ammonia solutions. Preferably, these solutions are aqueous sulfuric acid solutions.

Various metals can be recovered, for example, the basic reaction governing the leaching of copper from mineral deposits using an aqueous sulfuric acid solution (raffinate) is as follows:

$$Cu^{++} + H_2SO_4 \rightarrow CuSO_4 + 2H^+$$

The sulfate ion is regenerated in the solvent extraction stage when copper is extracted into the organic phase by the extractant. The acid is then regenerated in the raffinate, which is recycled to perform another cycle of the leaching operation.

The extraction and stripping steps of this process 68 and 70, respectively, may be based on the following exchange reactions when copper is being extracted and stripped, wherein X is an organic compound:

$$2HX_{(org)} + Cu^{2+}_{(aq)} \leftrightarrows CuX_{2(org)} + 2H^+_{(aq)},$$

wherein an aqueous sulfuric acid solution is used as the raffinate in the leaching step 66 of the process, and $$Cu(NH_3)_4^{2+}{}_{(aq)} + 2OH^- + 2H_2O + 2HX_{(org)} \leftrightarrows CuX_{2(org)} + 4NH_4OH_{(aq)},$$

wherein an aqueous ammonia solution is used as the raffinate in the leaching step 66 of the process. In the metal extraction step 68, $H^+$ is at low concentrations, and both reactions proceed to the right. Thus, the leaching medium (sulfuric acid or ammonia) is regenerated. In the metal stripping step 70, the electrolyte solution is more concentrated than the raffinate used in the leaching step 66. Thus, both of the above-listed reactions proceed to the left. Preferably, the electrolyte solution is about 3 to 6 times more concentrated than the raffinate. Most preferably, in copper, for example, the raffinate has a concentration of about 30 to 40 g/L and the electrolyte solution has a concentration of about 180 to 200 g/L.

The organic solution used in the process of the present invention can be any conventional organic solvent solution that can be used in hydrometallurgical processes. It includes an extractant dissolved in a diluent. A modifier may also optionally be added to the solution. Usually, the organic solution includes about 5 to 40% extractant. Any conventional extractant, diluent, and modifier may be used. The extractants that can be used to make up the organic solution include, but are not limited to, hydroxyoximes, 8-hydroxyquinoline, 8-(alkarylsulfonamido)-quinoline, hydroxybenzophenone oxime, aliphatic hydroxyoxime, substituted salicyl aldoxime, nonyl phenol, 5,8-diethyl-7-hydroxy-6-dodecanone oxime, 2-hydroxy-5-dodecyl benzophenone oxime, 2-hydroxy-5-nonyl benzophenone oxime, 2-hydroxy-5-nonyl acetophenone oxime, phenyl benzyl ketone oxime, substituted 8-hydroxy quinoline with isodecanol modifier, tributyl phosphate, methyl isobutyl ketone, dibutyl carbitol, naphthenic acids, versatic acid, di-2-ethylhexyl phosphoric acid, polyols, primary amines, secondary amines, tertiary amines, quaternary amines, sulfonic acid, and combinations of these extractants. One extractant formulation that can be used includes substituted salicyl aldoxime, which is a strong chelating agent, with various amounts of nonyl phenol added to it. Another extractant formulation includes the combination of a hydroxybenzophenone oxime and an aliphatic hydroxyoxime, which acts as a kinetic modifier. The extractant chosen should depend upon the metal being extracted, its selectivity over other metals present, and the composition of the ore in which it is found, according to conventional choices. Kerosene with an intermediate to low aromatic content (0–25%) may be used as a diluent for the extraction. Perchloroethylene or other chlorinated compounds may also be used as a diluent.

The scrub solution used in organic scrub station 98 is an aqueous solution. Any conventional aqueous solution used in hydrometallurgical processes may be used. This solution may be, but is not limited to, aqueous sulfuric acid, aqueous hydrochloric acid, or aqueous ammonia solutions. Preferably, this solution is an aqueous sulfuric acid solution. In one formulation, the scrub solution is comprised of about one part weak sulfuric acid and about twelve parts water. However, the concentration of the aqueous scrub solution may be varied depending upon local conditions.

The electrowinning step 72 of this process may be based upon the following chemical reaction, wherein copper is the desired metal being extracted and the raffinate is an aqueous sulfuric acid solution:

$$2CuSO_4 + 2H_2O \rightarrow 2Cu + 2H_2SO_4 + O_2$$

Copper sulfate in the metal electrolyte solution is transformed to copper and sulfuric acid by electrolysis, which involves applying DC current to the solution in an electrowinning cell of the electrowinning tankhouse 60.

The organic scrub station 98 described above can provide about 80 to 90% contaminant removal. It is also more cost effective than current systems. This organic scrub station 98 of the present invention may be used in any type of a hydrometallurgical plant. Specifically, it may be used in plants that extract a desired metal from its corresponding ore. Such desired metals include, but are not limited to, copper, nickel, cobalt, and uranium. The organic scrub station 98 of the present invention is particularly effective in plants where pregnant leach solution flowrates have been increased in order to off-set lower grades of desired metals in the leach areas. Such increases cause greater amounts of contaminants to become chemically bound to the loaded organic coalescers, and while loaded organic coalescers are not able to remove such chemically bound contaminants, the organic scrub station 98 of the present invention can.

The pumps, contactors, reactors, separators and coalescers can all be skid-mounted on movable structures, such as motorized vehicles, thus permitting the relocation of the plant to newer and more remote leach sites. In such a configuration, only the metal electrolyte solution must be pumped to the fixed tankhouse site and electrolyte flowrates are typically only about 20% of the pregnant leach solution and raffinate flows. If a vertical extraction column or horizontal AP column is used as the stage-wise, plug flow contactor, the column will be free-standing next to the skids. In the case of metals with lower production rates than copper, such as nickel and cobalt, the tankhouse may also be modularized.

The solvent extraction plant of the present invention is a compact, portable process plant that can be easily relocated to alternate mine sites making it unnecessary to pump leach solution back and forth from remote locations as a mine site matures, expands, or changes. Still further, this plant provides an improved quality metal electrolyte solution for electrowinning at a lower operating cost profile than conventional plants. The plant of the present invention requires less inventory of organic solution than conventional systems because it is a smaller system that utilizes an accelerated settling concept. Specifically, organic solution requirements most often are reduced to less than one-third of conventional usage requirements. The plant of the present invention also has a lower comparative capital development cost than conventional hydrometallurgical and pyrometallurgical mining plants.

In addition, there is no more than minimal air entrainment in the plant of the present invention because it is a closed system. Thus, the typical dispersion band in a conventional settler or separator will be minimal. Still further, only minimal or stable crud layers form in the separators used in the plant of the present invention. Furthermore, the entire system of the present invention can be mechanically automated for remote operation thereby reducing the number of site operating personnel required. In addition, the contactors used in the present invention create less carry over entrainment than the dynamic mixer/pumper-settlers of conventional plants.

From the foregoing, it will be seen that this invention is one well adapted to attain all the ends and objects hereinabove set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

We claim:

1. A plant for extracting metal from a metal ore's leach solution, comprising:
   a first stage-wise, plug flow contactor adapted to mix an aqueous solution and an organic solution into a first mixed emulsion;
   a first stage reactor adapted to receive said first mixed emulsion from said first contactor wherein said first reactor is adapted to gently mix said first emulsion allowing dwell time to bring the reaction to near completion;
   a first separator adapted to receive said first mixed emulsion from said first reactor, the separator having a first section comprised of coalescing material adapted to break up said first emulsion and a quiet zone adapted to further separate by gravitational forces said aqueous solution and said organic solution; and
   a loaded organic coalescer adapted to receive said organic solution from said first separator, wherein said loaded organic coalescer is adapted to remove aqueous entrainment from said organic solution.

2. The plant of claim 1, further comprising:
   a second stage-wise, plug flow contactor adapted to receive said organic solution from said loaded organic coalescer, wherein said second contactor is adapted to mix an electrolyte solution with said organic solution to form a second mixed emulsion;

a second stage reactor adapted to receive said second mixed emulsion from said second contactor wherein said second reactor is adapted to gently mix said second emulsion allowing dwell time to bring the reaction to near completion;

a second separator adapted to receive said second mixed emulsion from said second reactor, wherein said second separator has a first section comprised of coalescing material adapted to break up said second emulsion and a quiet zone adapted to further separate by gravitational forces said electrolyte solution and said organic solution; and an electrolyte coalescer adapted to receive said electrolyte solution from said second separator, wherein said electrolyte coalescer is adapted to remove organic entrainment from said electrolyte solution.

3. The plant of claim 2, further comprising:

a raffinate coalescer adapted to receive said aqueous solution from said first separator, wherein said raffinate coalescer is adapted to remove organic entrainment from said aqueous solution.

4. The plant of claim 3, wherein said organic solution exiting said second separator is directed to said first contactor for recycle, wherein said aqueous solution from metal ore's leach solution is directed to said first contactor for recycle, and wherein said electrolyte solution exiting said electrolyte coalescer is directed to said electrowinning tankhouse.

5. The plant of claim 4, wherein said plant is a closed system with respect to the atmosphere.

6. The plant of claim 5, wherein said plant is modular.

7. The plant of claim 2, wherein said first contactor and said second contactor are able to apply an approximately uniform shear during mixing.

8. The plant of claim 7, wherein said first contactor and said second contactor are static mixers.

9. The plant of claim 7, wherein said first contactor and said second contactor are vertical co-current extraction columns each having a stack of reciprocating perforated plates.

10. The plant of claim 7, wherein said first contactor and said second contactor are horizontal co-current agitated packed columns.

11. The plant of claim 3, further comprising:

an electrowinning tankhouse adapted to receive said electrolyte solution from said electrolyte coalescer, wherein metal cathodes are formed in said electrowinning tankhouse.

12. The plant of claim 1, further comprising:

a stage wise, plug flow contactor adapted to mix a scrub solution and a loaded organic solution into a mixed emulsion, wherein said loaded organic solution is comprised of an organic solution, a desired metal and contaminants; and a separator in fluid communication with said contactor, wherein said separator has a first section comprised of coalescing material adapted to break up said emulsion and a quiet zone adapted to further separate said scrub solution and said loaded organic solution by gravitational forces.

13. The plant of claim 1, wherein said coalescing material is able to minimize hold-up time in the vessel and maximizes separation efficiency.

14. A modular solvent extraction plant for extracting metal from a metal ore, comprising:

a first stage-wise, plug flow contactor adapted to receive a barren organic solution and a pregnant leach solution comprised of an aqueous solution and a metal, wherein said contactor is adapted to mix said pregnant leach solution and said barren organic solution into a first mixed emulsion and wherein said metal is transferred to said barren organic solution so as to form a loaded organic solution and said pregnant leach solution becomes raffinate;

a first separator adapted to receive said mixed emulsion from said first contactor, wherein said separator has a first section comprised of coalescing material adapted to break up said first mixed emulsion and a quiet zone adapted to further separate by gravitational forces said raffinate from said loaded organic solution;

a loaded organic coalescer adapted to receive loaded organic solution from said first separator, wherein said loaded organic coalescer is adapted to remove raffinate entrainment from said loaded organic solution;

a raffinate coalescer adapted to receive raffinate from said first separator, wherein said raffinate coalescer is adapted to remove organic entrainment from said raffinate;

a second stage-wise, plug flow contactor adapted to receive said loaded organic solution from said loaded organic coalescer and adapted to receive an electrolyte solution, wherein said second contactor is adapted to mix said loaded organic solution and said electrolyte solution into a second mixed emulsion and wherein said metal in said loaded organic solution is transferred to said electrolyte solution resulting in a second mixed emulsion of a barren organic solution and a metal electrolyte solution;

a second separator adapted to receive said second mixed emulsion from said second contactor, wherein said separator has a first section comprised of a coalescing material adapted to break up said second mixed emulsion and a quiet zone adapted to further separate by gravitational forces said metal electrolyte solution from said barren organic solution;

an electrolyte coalescer adapted to receive said metal electrolyte solution from said second separator, wherein said electrolyte coalescer is adapted to remove organic entrainment from said metal electrolyte solution; and an electrowinning tankhouse adapted to receive said metal electrolyte solution from said electrolyte coalescer, wherein metal cathodes are formed in said tankhouse.

* * * * *

UNITED STATES PATENT AND TRADEMARK OFFICE
CERTIFICATE OF CORRECTION

PATENT NO.    : 6,350,354 B1                                                    Page 1 of 1
DATED         : February 26, 2002
INVENTOR(S)   : Mark Neuman et al.

It is certified that error appears in the above-identified patent and that said Letters Patent is hereby corrected as shown below:

Title page,
Item [56], References Cited, OTHER PUBLICATIONS, delete "Mehtods" and insert -- Methods -- therefor.
Item [57], ABSTRACT,
Line 2, delete "are" and insert -- ore -- therefor.

Column 2,
Line 12, delete "it," and insert -- at -- therefor.

Column 3,
Line 28, delete "less;" and insert -- less -- therefor.

Column 5,
Line 59, delete "contactor" and insert -- contactor(s), -- therefor.
Line 60, delete "(s), reactor(s)," and insert -- reactor(s), -- therefor.

Column 10,
Line 12, delete "(not shown)".
Line 29, delete "c:contactor" and insert -- contactor -- therefor.
Line 41, delete "to line 224" and insert -- to line 22 -- therefor.
Line 42, delete "to line 224" and insert -- to line 22 -- therefor.

Column 12,
Line 40, delete "CuX2" and insert -- $CuX_2$ -- therefor.
Line 44, delete "H$^+$is" and insert -- $H^+$ is -- therefor.

Signed and Sealed this

Twenty-sixth Day of November, 2002

Attest:

Attesting Officer

JAMES E. ROGAN
*Director of the United States Patent and Trademark Office*